US012786948B2

(12) United States Patent
Priyanto et al.

(10) Patent No.: US 12,786,948 B2
(45) Date of Patent: Nov. 3, 2026

(54) POSITION ESTIMATE BASED ON TRANSMISSION BEAM PROPERTIES

(71) Applicant: Sony Group Corporation, Tokyo (JP)

(72) Inventors: Basuki Priyanto, Lund (SE); Anders Berggren, Lund (SE); José Flordelis, Lund (SE); Yujie Zhang, Lund (SE); Johan Hill, Lund (SE)

(73) Assignee: Sony Group Corporation, Tokyo (JP)

( * ) Notice: Subject to any disclaimer, the term of this patent is extended or adjusted under 35 U.S.C. 154(b) by 337 days.

(21) Appl. No.: 18/270,816

(22) PCT Filed: Jan. 11, 2022

(86) PCT No.: PCT/EP2022/050416
§ 371 (c)(1),
(2) Date: Jul. 3, 2023

(87) PCT Pub. No.: WO2022/152684
PCT Pub. Date: Jul. 21, 2022

(65) Prior Publication Data

US 2024/0064694 A1 Feb. 22, 2024

(30) Foreign Application Priority Data

Jan. 15, 2021 (SE) .................................... 2150032-7

(51) Int. Cl.
*H04W 64/00* (2009.01)
*H04L 5/00* (2006.01)
*H04L 27/26* (2006.01)

(52) U.S. Cl.
CPC ......... *H04W 64/006* (2013.01); *H04L 5/0048* (2013.01); *H04L 27/261* (2013.01)

(58) Field of Classification Search
CPC ................ H04W 64/006; H04W 64/00; H04L 5/0048; H04L 27/261; G01S 3/74; G01S 5/02; G01S 5/0244; G01S 5/04
See application file for complete search history.

(56) References Cited

U.S. PATENT DOCUMENTS 9,813,867 B2 * 11/2017 Prevatt ...................... G01S 3/74
10,517,061 B1 12/2019 Kumar
(Continued)

FOREIGN PATENT DOCUMENTS

CN 111131997 A 5/2020
EP 3306337 A1 4/2018
(Continued)

OTHER PUBLICATIONS

International Search Report and Written Opinion from corresponding International Application No. PCT/EP2022/050416, mailed on May 10, 2022, 3 pages.
(Continued)

*Primary Examiner* — Kabir A Timory
(74) *Attorney, Agent, or Firm* — Tucker Ellis LLP

(57) ABSTRACT

Examples provide a method of operating an access node (AN), wherein the method comprises receiving, from a wireless communication device, UE, on a radio channel, a reference signal; determining a reception property of the reference signal; determining an identifier of the reference signal from the reference signal, wherein the identifier is associated with a transmission property of the reference signal; and providing, to a location server node (LN), a message indicative of the reception property of the reference signal and the identifier of the reference signal. According to further aspects, a method of operating a wireless communication device, a method of operating a location server node, a wireless communication device, an access node and a location server node are provided.

12 Claims, 6 Drawing Sheets

(56) References Cited

U.S. PATENT DOCUMENTS

| | | | | |
|---|---|---|---|---|
| 12,085,637 | B2 * | 9/2024 | Chen | G01S 13/878 |
| 2018/0324738 | A1 | 11/2018 | Stirling-Gallacher | |
| 2020/0145977 | A1 | 5/2020 | Kumar | |
| 2021/0337496 | A1 | 10/2021 | Da | |
| 2022/0312153 | A1 * | 9/2022 | Manolakos | H04W 64/00 |
| 2022/0393748 | A1 * | 12/2022 | Hill | H04B 7/0617 |

FOREIGN PATENT DOCUMENTS

| | | | |
|---|---|---|---|
| EP | 3866494 | A1 | 8/2021 |
| WO | WO-2018083610 | A1 | 5/2018 |
| WO | 2019135105 | A1 | 7/2019 |
| WO | WO-2020073876 | A1 | 4/2020 |
| WO | 2020164710 | A1 | 8/2020 |
| WO | 2021006796 | A1 | 1/2021 |

OTHER PUBLICATIONS

Office Action and Search Report from corresponding Swedish Application No. 2150032-7, mailed on Oct. 1, 2021, 3 pages.

Intel Corporation, "Analysis of Techniques for NR UL Positioning," 3GPP TSG RAN WG1 Ad-Hoc Meeting 1901, R1-1900513, Jan. 21-25, 2019, 15 pages.

3GPP TSG RAN WG1 Ad-Hoc Meeting 1901, ntel Corporation,Analysis of Techniques for NR UL Positioning, Jan. 25, 2019.

* cited by examiner

POSITION ESTIMATE BASED ON TRANSMISSION BEAM PROPERTIES

TECHNICAL FIELD

Examples generally relate to determining a position estimate of a wireless communication device.

BACKGROUND

Mobile devices such as wireless communication devices (sometimes also referred to as user equipment; UE) offer various use cases. A main use case is wireless communications. A further use case is positioning of the UE.

To facilitate positioning of UEs, multilateration or multiangulation techniques can be employed. An example of multilateration is trilateration. Here, multiple access nodes (AN)—having a well-defined position in a reference coordinate system—transmit positioning signals (also referred to as positioning reference signals, PRSs). A UE can receive the PRSs; then it is possible to perform multilateration or multiangulation. One particular positioning technique is observed time-difference of arrival (OTDOA).

OTDOA is, in particular, deployed in Third Generation Partnership Project (3GPP) cellular networks, such as the Long Term Evolution (LTE) 4G or New Radio (NR) 5G protocols. Here, the UE may receive PRSs from multiple base stations (BSs) or Transmission/Reception Points (TRPs) implementing the ANs and then performs a timing difference of arrival (TDOA) measurement. Results of the TDOA measurements in a form of reference signal time difference (RSTD) report are transmitted from the UE to a location server node (LN) using an LTE positioning protocol (LPP). This is via the 3GPP radio access network (RAN). The LN then performs the positioning estimation based on multilateration and/or multiangulation of at least two or at least three results of the TDOA measurements. See 3GPP Technical specification (TS) 38.305, V16.0.0 (2018-03), section 4.3.3.

Many regulatory as well as commercial use cases require obtaining a position estimate of a wireless communication device (UE) connected to a communications network via a radio link. Various location technologies are known to support these known regulatory as well as commercial use cases.

Performing the positioning measurement may comprise receiving positioning reference signals from a wireless communication device by one or more access nodes of the communications network.

The one or more access nodes may determine the respective reception properties of the positioning signals, e.g. the respective angle of arrival of the positioning reference signals, and transmit a message indicative of the reception properties to the LN which may determine a position of the UE based on the different reception properties.

SUMMARY

There may be a need for increasing the accuracy and reliability with which the position of a wireless communication device may be determined.

Said need is addressed with the subject-matter of the independent claims. The dependent claims describe advantageous examples.

According to a first aspect, examples provide a method of operating an access node (AN), wherein the method comprises receiving, from a wireless communication device, UE, on a radio channel, a reference signal; determining a reception property of the reference signal; determining an identifier of the reference signal from the reference signal, wherein the identifier is associated with a transmission property of the reference signal; and providing, to a location server node (LN), a message indicative of the reception property of the reference signal and the identifier of the reference signal.

According to a second aspect, examples provide a method of operating a wireless communication device (UE), wherein the method comprises transmitting, on a radio channel, a reference signal using a transmission property associated with an identifier of the reference signal, wherein the transmitted reference signal is indicative of the identifier of the reference signal.

According to a third aspect, examples provide a method of operating a location server node (LN), wherein the method comprises obtaining, from one or more access nodes (ANs) a message indicative of a reception property of a reference signal and an identifier of the reference signal; determining, from the identifier of the reference signal, a transmission property of the reference signal and a wireless communication device (UE) associated with the reference signal; and determining a position estimate of the UE based on the reception property and the transmission property of the reference signal.

According to a fourth aspect, examples provide an access node, wherein the AN comprises control circuitry causing the AN to perform receiving, from a wireless communication device, UE, on a radio channel, a reference signal; determining a reception property of the reference signal; determining an identifier of the reference signal from the reference signal, wherein the identifier is associated with a transmission property of the reference signal; and providing, to a location server node (LN), a message indicative of the reception property of the reference signal and the identifier of the reference signal.

According to a fifth aspect, examples provide a wireless communication device (UE), wherein the UE comprises control circuitry causing the UE to perform transmitting, on a radio channel, a reference signal using a transmission property associated with an identifier of the reference signal, wherein the transmitted reference signal is indicative of the identifier of the reference signal.

According to a sixth aspect, examples provide a location server node (LN), wherein the LN comprises control circuitry causing the LN to perform obtaining, from one or more access nodes (ANs) a message indicative of a reception property of a reference signal and an identifier of the reference signal; determining, from the identifier of the reference signal, a transmission property of the reference signal and a wireless communication device (UE) associated with the reference signal; and determining a position estimate of the UE based on the reception property and the transmission property of the reference signal.

It is to be understood that the features mentioned above and those yet to be explained below may be used not only in the respective combinations indicated, but also in other combinations or in isolation without departing from the scope of the invention.

DETAILED DESCRIPTION

Figure 1:
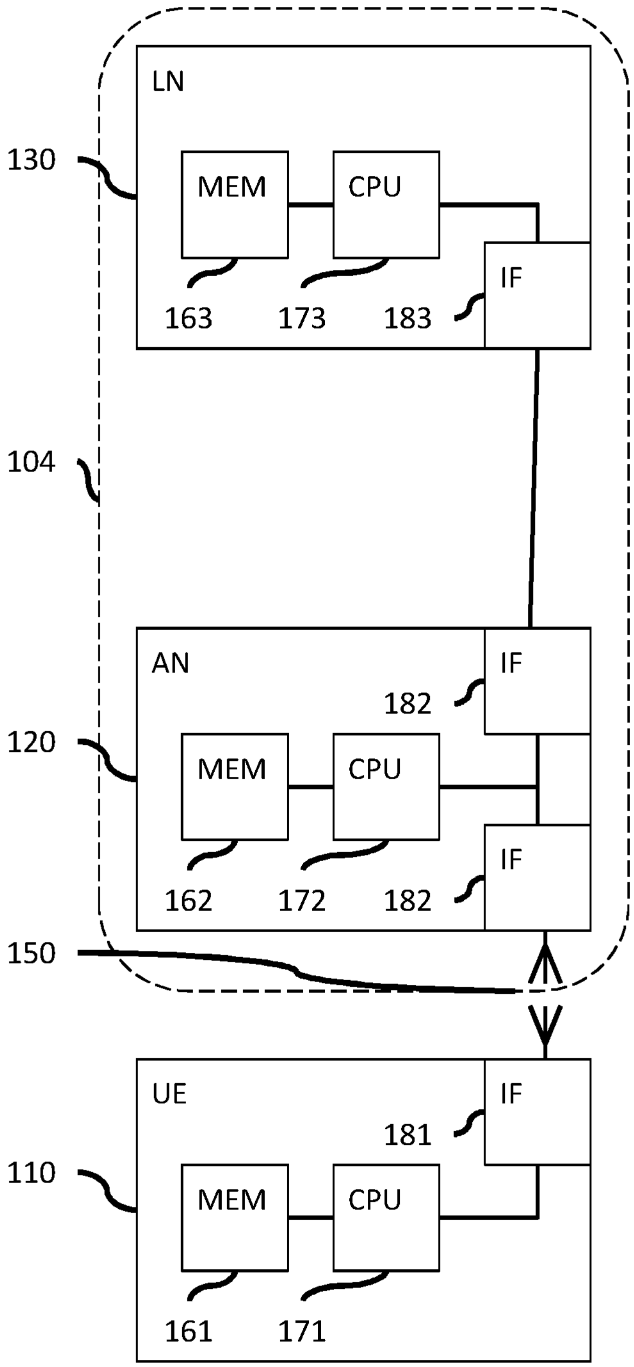
FIG. 1 schematically illustrates a communications network.

Some examples generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

FIG. 1 schematically depicts a communications network 104 and a UE 110 being connected to an AN 120 of the communications network 104 via a radio link 150. The UE 110 comprises processing circuitry 171 operably connected to memory circuitry 161 and interface circuitry 181. The processing circuitry 171 may be configured for performing exemplary methods as described herein. The interface circuitry 181 of the UE 110 and the interface circuitry 182 of the AN 120 may allow for communication on the radio link 150. The AN 120 comprises processing circuitry 172 operably connected to the interface circuitry 182 and to memory circuitry 162 for performing exemplary methods as described herein. The interface circuitry 182 may be directly or indirectly connected with interface circuitry 183 of an LN 130. Processing circuitry 173 of the LN 130 may be operably connected to the interface circuitry 183 and memory circuitry 163 for performing exemplary methods as described herein.

The LN can communicate with, e.g., the ANs and/or the UE using an NRPPa (NR Positioning Protocol A) protocol, and an LTE positioning protocol (LPP), respectively. The LN can determine/estimate the location (or position) of the UE. For the sake of simplicity, various scenarios are described hereinafter with respect to an implementation of the communications network by a cellular network. The cellular network includes multiple cells. Each cell corresponds to a respective sub-area of the overall coverage area. Other example implementations include Institute of Electrical and Electronics Engineers (IEEE) WLAN network, MulteFire, etc.

Figure 2:
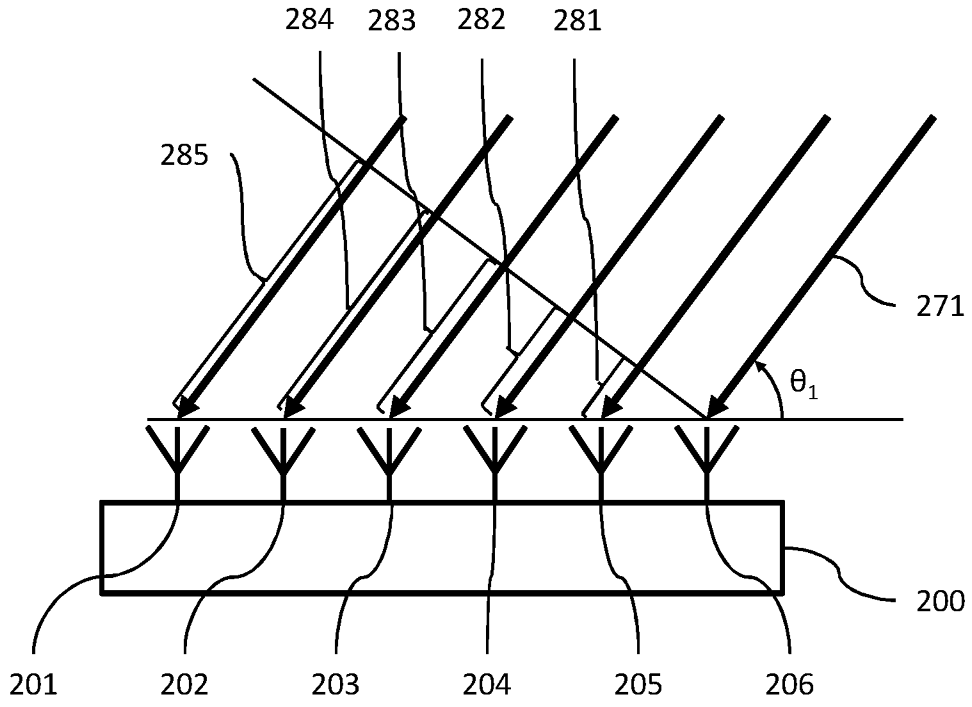
FIG. 2 illustrates a method for determining an angle of arrival of a reference signal.

FIG. 2 illustrates a method for determining an Angle of Arrival (AoA) of a positioning signal. AoA in the context of positioning may refer to the elevation and azimuth angle of a received reference signal. The AoA may be used to locate a UE or to refine time difference of arrival (TDOA) location measurements. In uplink-based positioning, the AoA may be determined by measuring reception properties of a reference signal transmitted by a UE using an antenna array of an AN.

FIG. 2 shows an antenna array 200 of an AN. The antenna array 200 comprises antenna elements 201, 202, 203, 204, 205, 206. The antenna array 200 may be used to receive a reference signal 271 (shown with solid lines). Depending on the AoA at the antenna elements 201, 202, 203, 204, 205, 206, they may receive the reference signal 271 at different times. The time differences 285, 284, 283, 282, 281 are calculated by subtracting the time of arrival of the signal at one antenna element 206 from the time of arrival at the other antenna elements 201, 202, 203, 204, 205. In combination with a known distance between the antenna elements 201, 202, 203, 204, 205, 206, the time difference may allow for determining the AoA of the reference signals 271.

Figure 3:
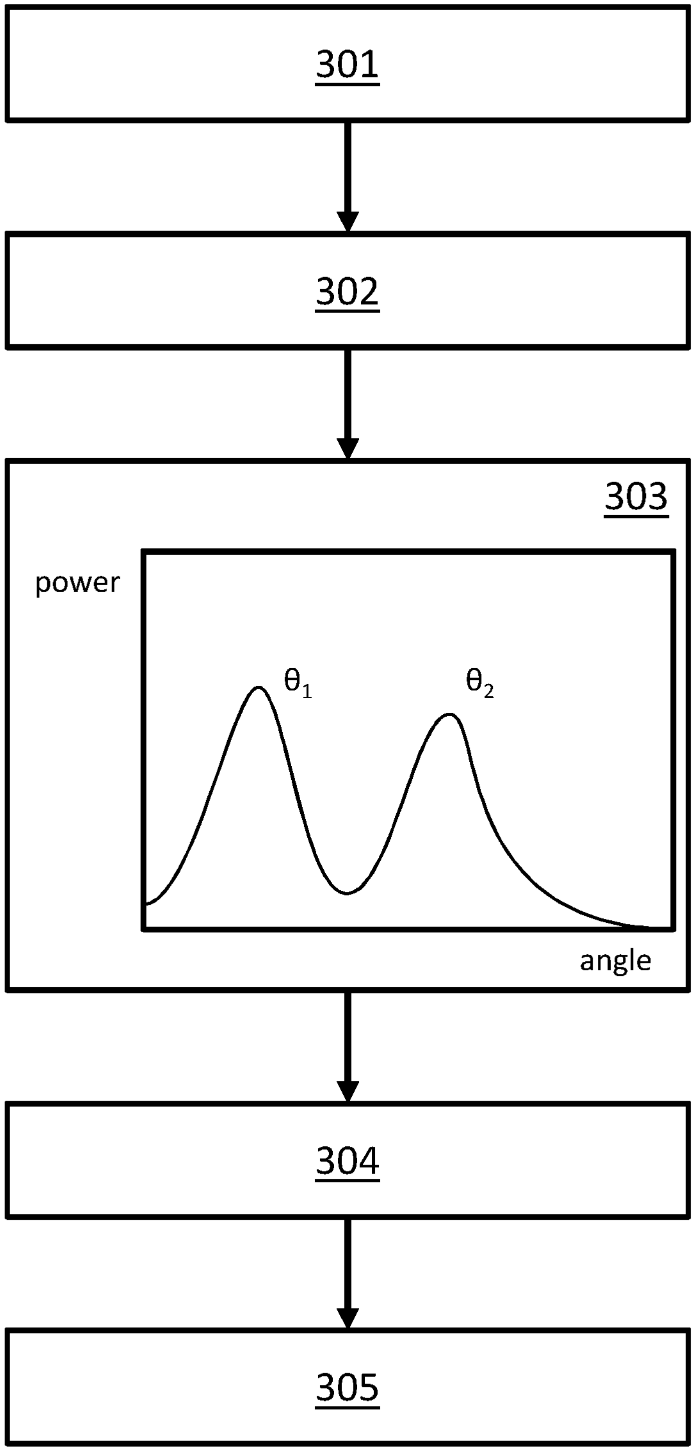
FIG. 3 illustrates a method for determining a reception property of a reference signal.

The signals with different phases provided by the antenna elements 201, 202, 203, 204, 205, 206 are received in step 301 of FIG. 3. These received signals may then be processed in step 302 of FIG. 3 to estimate the power of the reference signal received from a certain angle as shown in step 303 of FIG. 3. Theretofore, different algorithms may be used. MUSIC (Multiple signal classification) and other subspace-based approaches may be used for estimating angular spectrum estimations in NR. The AoAs may be detected by finding peaks in the power angular spectrum in step 304 of FIG. 3. More than one peak may be detected in the power angular spectrum. This may be due to multi-path propagation of the reference signal. For example, in indoor applications the reference signal may be reflected several times by walls, windows, etc. The actual AoA corresponding to the line of sight (LOS) may be determined using a maximum likelihood algorithm. A power angular spectrum is obtained in step 305 of FIG. 3.

In examples, the reception property of the reference signal comprises a coefficient measurement of a first path of the reference signal. A coefficient measurement of a first path of the reference signal may relate to a measurement comparing a property of the reference signal received through a first path with one or more measurements of a property of the reference signal received through one or more other paths. An example of the reception property may also be called First Path Average Ratio (FPAR). The FPAR is the ratio between the quantity of a first path in the Power Delay Profile (PDP) and the average of the PDP.

The coefficient measurement of a first path of the reference signal may be an indicator showing the reliability of an AoA measurement. The PDP may be calculated from a cross-correlation between the received reference signal and the replica of transmitted reference signal. The reported FPAR may take the form of a normalized value (e.g. normalized to 1).

In examples, the reception property of the reference signal comprises a statistical property of an AoA. The computation in step 304 may produce multiple peaks corresponds to multiple AoAs. Statistical property can be the standard deviation of the multiple AoA values. In further examples, the reception property may include at least one of an uplink angle of arrival (UL-AoA) and/or a Reference Signal Received Power (RSRP).

Figure 4:
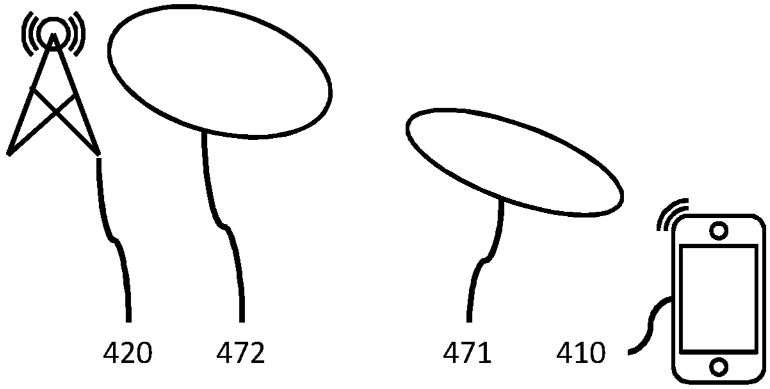
FIG. 4 illustrates a wireless communication device transmitting a reference signal using a first beam property.
Figure 5:
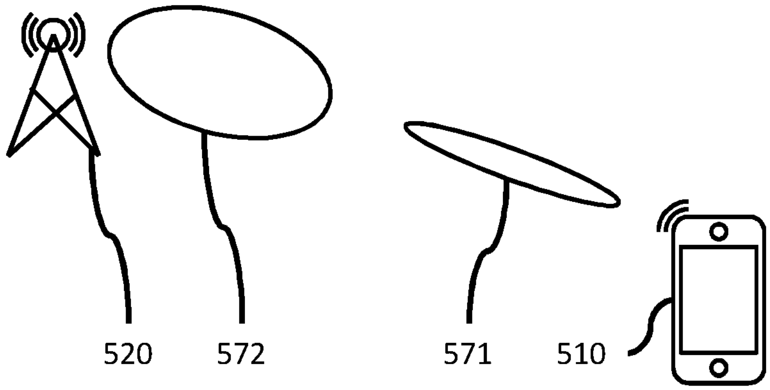
FIG. 5 illustrates a wireless communication device transmitting a reference signal using a second beam property.
Figure 6:
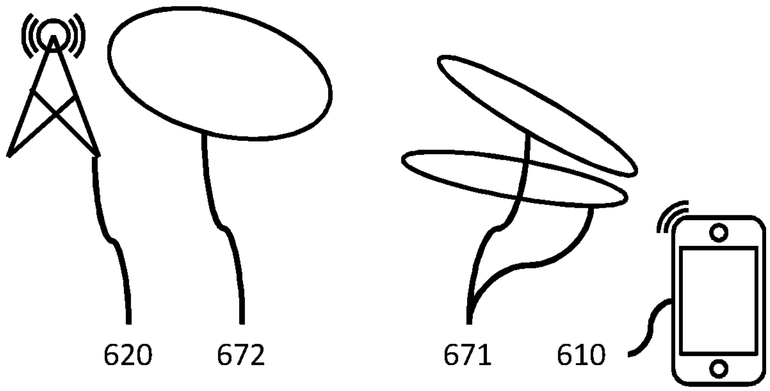
FIG. 6 illustrates a wireless communication device transmitting a reference signal using a third beam property.

FIGS. 4 to 6 show different examples of transmission beams used for transmitting reference signals from a UE 410, 510, 610 to an AN 420, 520, 620 and receive beams 472, 572, 672 used by the AN 420, 520, 620 for receiving the reference signals 471, 571, 671 from the UE 410, 510, 610. The beams may have different properties. For example, the beam 471 is wider than the beam 571 and the beam 671 may comprise two lobes instead of only one lobe. Knowledge of the beam properties may allow to determine a better position estimate of the UE 410, 510, 610.

Figure 7:
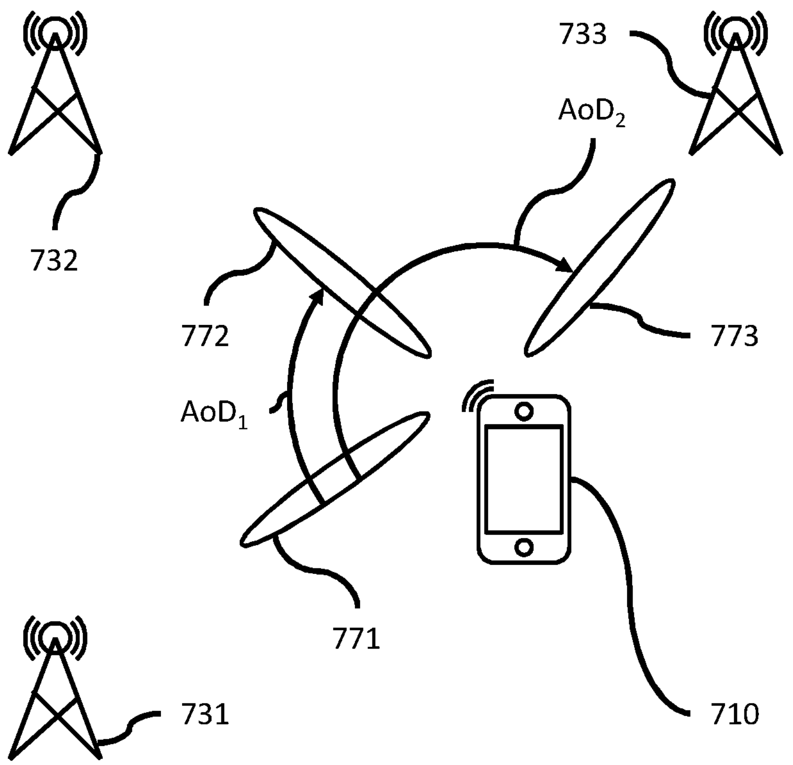
FIG. 7 illustrates a wireless communication device transmitting a reference signal using different angles of departure.

FIG. 7 shows a UE 710 transmitting reference signals 771, 772, 773 with different angles of departure targeting to different AN. The ANs 731, 732, 733 may receive the reference signals 771, 772, 773 with certain angles of arrival. Due to multi-path propagation (see above), the angles of departure of the reference signals 771, 772, 773 may differ from the respective angles of arrival determined by the AN 731, 732, 733. Making the LN aware of the actual angle of departure of a certain reference signal, may allow the LN to provide a better position estimate of the position of the UE 710. As shown in FIG. 7, the angles of departure $AoD_1$ and $AoD_2$ may be defined with respect to a spatial direction of the transmission beam from the UE 710 to the serving AN 731. However, the angles of departure may also be defined with respect to a coordinate system of the UE or with respect to a global coordinate system. For example, the UE may have sensors to determine the direction of gravity and/or the direction to magnetic north and may determine the angle of departure of the reference signal with respect to at least one of said directions.

Figure 8:
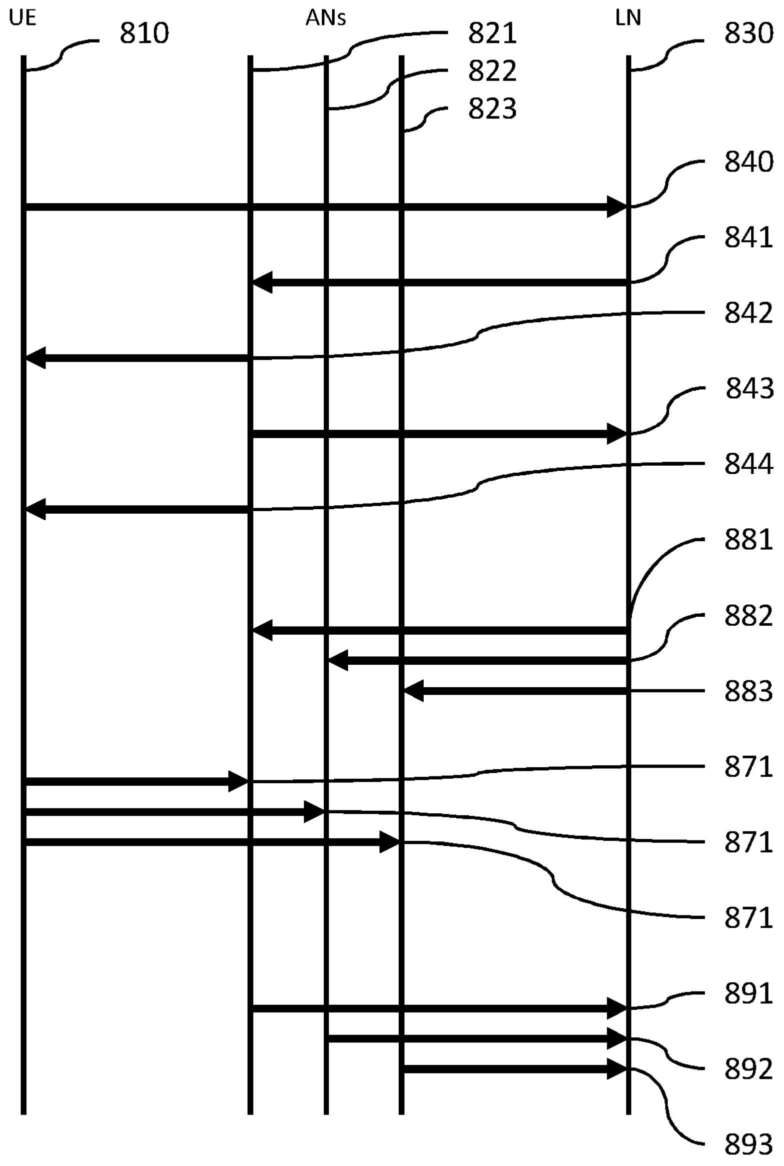
FIG. 8 illustrates signaling between a wireless communication device, access nodes, and a location server node.

FIG. 8 may be used to illustrate an example of a method for determining an improved position estimate of a UE 810. A UE 810 may provide a message 840 indicative of the capabilities of the UE 810. In particular, the message 840 may indicate that the UE 810 is capable of transmitting a reference signal using a transmission property associated with an identifier of the reference signal wherein the transmitted reference signal is indicative of the identifier of the reference signal. A transmission property may correspond to a shape of a transmission beam. The UE 810 may provide the message 840 to the LN 830 via the AN 821. The AN 821 may be considered as a serving AN 821 currently connecting the UE 810 to the communication network.

The LN 830 may provide a positioning information request 841 to the serving AN 821. The serving AN 821 may determine the time/frequency resources to be used by the UE 810 for transmitting the reference signals required for determining the position estimate. The UE 810 may receive a signal 842 indicative of the respective time/frequency resources. The serving AN 821 may provide a message 843 indicative that the time/frequency resources have been configured to the LN 830. Afterwards, the AN 821 may transmit a signal 844 to the UE 810 triggering the UE 810 to transmit the reference signal 871 and the LN 830 may provide messages 881, 882, 883 to the ANs 821, 822, 823 triggering them to determine a reception property of the reference signal 871.

The ANs 821, 822, 823 each receive the reference signal 871 on the radio channel from the UE 810. The ANs 821, 822, 823 each determine a reception property of the reference signal 871. Determining a reception property of the reference signal 871 may also be considered as performing measurements on the reference signal 871. In addition, the ANs 821, 822, 823 determine an identifier of the reference signal from the reference signal 871. In examples, the identifier may be carried by the reference signal 871. The identifier may be carried as a data payload of the reference signal. One or more resource elements are used for transmitting the reference signal 871. In examples, the specific resource elements which are used for transmitting the reference signal 871 may be indicative of the identifier of the reference signal 871.

The ANs 821, 822, 823 may then provide messages 891, 892, 893 indicative of the reception property of the reference signal 871 and the identifier of the reference signal 871 to the LN 830. The LN 830 may determine the transmission property of the reference signal 871 from the identifier of the reference signal and the UE 810 associated with the reference signal 871. In particular, the LN 830 may determine which UE has transmitted the reference signal 871. The LN 830 may then determine a position estimate of the UE 810 based on the reception property and the transmission property of the reference signal 871. The additional usage of the transmission property may enhance the accuracy and/or precision of the position estimate. Further, the LN 830 may determine a quality of the position estimate. In some examples, the transmission property of the reference signal 871 and the reception properties determined by the different ANs 821, 822, 823 may be used to determine a position estimate including an orientation of the UE 810.

The transmission property of the reference signal 871 may comprise at least one of a spatial filter for transmitting the reference signal 871; a beam width information, in particular an information on the half power beam width (HPBW), of the beam used for transmitting the reference signal 871; a beam pattern used for transmitting the reference signal 871; and a beam forming codebook.

FIG. 8 may also be used to illustrate an additional example of a method for determining an improved position estimate of a UE 810, wherein the method is not based on using a transmission property of the reference signal but based on using an angle of departure of the reference signal. A UE 810 may provide a message 840 indicative of the capabilities of the UE 810. In particular, the message 840 may indicate that the UE 810 is capable of transmitting a reference signal using an angle of departure associated with an identifier of the reference signal, wherein the transmitted reference signal is indicative of the identifier of the reference signal. The UE 810 may provide the message 840 to the LN 830 via the AN 821. The AN 821 may be considered as serving AN 821 currently connecting the UE 810 to the communication network.

The LN 830 may provide a positioning information request 841 to the serving AN 821. The serving AN 821 may determine the time/frequency resources to be used by the UE 810 for transmitting the reference signals required for determining the position estimate. The UE 810 may receive a signal 842 indicative of the respective time/frequency resources. The serving AN 821 may provide a message 843 indicative that the time/frequency resources have been configured to the LN 830. Afterwards, the AN 821 may transmit a signal 844 to the UE 810 triggering the UE 810 to transmit the reference signal 871 and the LN 830 may provide messages 881, 882, 883 to the ANs 821, 822, 823 triggering the ANs 821, 822, 823 to determine a reception property of the reference signal 871.

The ANs 821, 822, 823 each receive the reference signal 871 on the radio channel from the UE 810. The ANs 821, 822, 823 each determine a reception property of the reference signal 871. Determining a reception property of the reference signal 871 may also be considered as performing measurements on the reference signal 871. In addition, the ANs 821, 822, 823 determine an identifier of the reference signal from the reference signal 871. In examples, the identifier may be carried by the reference signal 871. The indicator may be carried as a data payload of the reference signal. One or more resource elements are used for transmitting the reference signal 871. In examples, the specific resource elements which are used for transmitting the reference signal 871 may be indicative of the identifier of the reference signal 871.

The ANs 821, 822, 823 may then provide messages 891, 892, 893 indicative of the reception property of the reference signal 871 and the identifier of the reference signal 871 to the LN 830. In examples, the ANs 821, 822, 823 may determine an estimated angle of departure of the reference signal based on a reception property of the reference signal 871. The LN 830 may determine the AoD of the reference signal 871 from the identifier of the reference signal 871 and the UE 810 associated with reference signal 871. In particular, the LN 830 may determine which UE has transmitted the reference signal 871. The LN 830 may then determine a position estimate of the UE 810 based on the reception property and the estimated AoD of the reference signal 871 determined by the ANs 821, 822, 823 and/or the AoD determined from the identifier of the reference signal. The additional usage of the AoD and/or the estimated AoD of the reference signal 871 may enhance the accuracy and/or precision of the position estimate. The LN 830 may further determine a quality of the position estimate. In some examples, the position estimate may also include an orientation of the UE 810 with respect to a global reference system.

It is also possible to combine aspects of the two methods for determining a position estimate. In particular, both the transmission property and the AoD (or estimated AoD) may be used by the LN 830 for determining the position estimate. This may further enhance the reliability of the position estimate.

The messages 891, 892, 893 mentioned above may comprise further information. In particular they may include at least one of physical cell ID (PCI), group cell ID (GCI) and transmission and reception point ID (TRP ID) of the measurement, a UL Angle of Arrival (azimuth and elevation), a UL SRS-RSRP, a time stamp of the measurement and a quality for each measurement. The UL Angle of Arrival (UL AoA) may be defined as the estimated azimuth angle of a UE with respect to a reference direction as proposed in 3GPP TR 38.215-v16.2. The reference direction may be defined in the global coordinate system (GCS), wherein the estimated azimuth angle is measured relative to geographical north and is positive in a counter-clockwise direction and the estimated vertical angle is measured relative to zenith and positive to horizontal direction. In examples, the reference directions may also be defined in a local coordinate system (LCS), wherein the estimated azimuth angle is measured relative the x-axis of the LCS and positive in a counter-clockwise direction and the estimated vertical angle is measured relative to the z-axis of the LCS and positive to the x-y-plane direction. The bearing, downtilt and slant angles of the LCS may be defined according to 3GPP TS 38.901. The UL AoA may be determined at an antenna array of an AN for an UL channel corresponding to the specific UE.

There may be receiving beam orientation uncertainties when an AN arranges the receiving beam for the reception of reference signals, in particular for SRS reception. Legacy standards may provide for an angle of arrival granularity of 0.1 degree (cf., e.g., 3GPP TS 38.455). The errors and/or uncertainties of the receiving beam orientation may affect the AoA accuracy which may lead to positioning estimation accuracy degradation. In addition, in a multipath environment, the reference signal may not be received from the UE in a direct path (Line of Sight, LOS) but from other directions due to reflection/refraction of the signal (Non-Line-of-Sight, NLOS). The methods and devices address these challenges to obtain a position estimate with higher accuracy, precision and reliability.

As shown above, in practice the UE transmission beam can have various shapes. It is proposed to exploit information of the shapes at the LN to improve the accuracy of the position estimate. The proposed modification can include one or a combination of the following measures. The measurement report from the AN to the LN may include an indicator associated with a transmission property of the reference signal. For example, a SRS resource ID may be added in the measurement report. The indicator may correspond to the SRS resource ID of the associated existing UL-SRS RSRP. Multiple UL-SRS RSRP and the associated SRS resource ID may be reported. For example, a number N of the best UL-SRS RSRP measured at the AN may be included. Further, the measurement report may include an estimated AoD of the UE when transmitting the SRS. The SRS resource ID may be interpreted by the LN as the indication of a beam ID of the UL SRS. For example, LN may identify whether the UE uses the same transmission beam or a different transmission beam to reach the multiple ANs.

Further, when the UE transmits a reference signal (e.g., SRS), the UE may also send the transmission beams' properties and/or characteristics. This information may be sent to the LN via a serving AN in a separate channel transmission using the LPP protocol. The beam characteristics/properties may include beam width information (i.e. Half Power Beamwidth (HPBW)), beam pattern, beamforming codebook, beam steering angle. The relative angle of departure (AoD) of the selected beams to the ANs may also be transmitted. The reference direction for the AoD may be the transmission beam to the serving AN. In case the UE is equipped with a compass and/or further sensors (e.g., inertial measurement unit (IMU), magnetometer, barometer), with which the UE can identify a reference direction, the UE may also provide the angle direction of each beam (azimuth, elevation). The transmission beam properties may be pre-configured. Hence, the UE transmits the reference signal with the pre-configured beam properties and not necessarily convey the transmission beam property each time the UE needs to transmit the reference signal. The UE may send information on the transmission properties of possible transmission beams for the transmission of the reference signals to the LN and/or the serving AN beforehand. When the serving AN/LN triggers the transmission of reference signals, the serving AN/LN may also indicate which transmission beam configuration is to be used by the UE.

To further improve the position or localization accuracy, AoD may be used to assist with the UL-AoA positioning. In this case, UE may apply beam sweeping or the transmission with multiple beams directing to the ANs. Some UE Tx beam information (e.g. beam pattern) can be optionally reported to the LN for the UL-AoD estimation by the AN or to be used internally in the LN to refine UL-AoA determination. If this information is known by the LN, the LN may able to evaluate the accuracy of an AoD measurement by calculating the Tx beam width. Besides that, the effect of side lobe in the Tx beam may be suppressed or mitigated.

The AoD information can be used for determining a position estimate of the UE by applying localization algorithms by the LN. The AoD information may be used alone or together with the other parameters, such as TDOA and AoA. In case the AN provides multiple AoAs to the LN, AoD or UE beam related information can be used to determine possibly inaccurate AoAs derived from NLOS components of the reference signal.

Aspects of the disclosure may be summarized as follows below. 3GPP Rel-16 specified various location technologies to support regulatory as well as commercial use cases. Rel-17 NR Positioning address higher accuracy location requirements resulting from new applications and industry verticals. Enhancements and solutions to meet the following exemplary performance targets will be investigated and specified. For general commercial use cases (e.g., TS 22.261): a sub-meter level position accuracy (<1 m) is envisaged and for IIoT use Cases (e.g., 22.804) a position accuracy below 0.2 m is foreseen. The target latency requirement is <100 ms; for some IIoT use cases, latency in the order of even 10 ms is desired.

The Access & Mobility Function (AMF) of a NR (New Radio) positioning architecture may receive a request for a location service associated with a UE. Then, the AMF sends a location service request to a Location Management Function (LMF) where it has a connection to an Evolved Serving Mobile Location Centre (E-SMLC) as defined by the 3GPP 5G protocol. The E-SMLC or the location server node (LN) has NR/E-UTRAN (Evolved UMTS Terrestrial Radio Access Network as defined by the 3GPP 5G protocol) access information. For example, the LN can trigger a positioning measurement at the UE. When using DL-TDoA (Downlink-Time Difference of Arrival) or DL-AoD (Downlink-Angle of Departure), the UE performs positioning measurements based on the positioning reference signals (PRS) from the AN, in particular gNB(s). PRSs are typically transmitted periodically and simultaneously from multiple gNBs. The UE performs reference signal time difference (RSTD) measurements and/or reference signal received power (RSRP) measurements. The UE transmits the positioning measurement report back to the E-SMLC via one of the gNBs. The E-SMLC calculates the positioning estimate based on the received positioning measurement. From this simple illustration, it can be observed that the end-to-end latency may involve many signaling paths in both core network and radio access network.

Although the disclosure has been shown and described with respect to certain preferred examples, equivalents and modifications will occur to others skilled in the art upon the reading and understanding of the specification. The present disclosure includes all such equivalents and modifications and is limited only by the scope of the appended claims.

Summarizing, at least the following examples have been described above, wherein technical features specified in the examples are followed by reference signs relating to these features, placed in parentheses, to increase the intelligibility of the examples. These reference signs shall not be construed as limiting the disclosure of the examples.

EXAMPLE 1. A method of operating an access node, AN, the method comprising receiving, from a wireless communication device, UE, on a radio channel, a reference signal, determining a reception property of the reference signal, determining an identifier of the reference signal from the reference signal, wherein the identifier is associated with a transmission property of the reference signal, providing, to a location server node, LN, a message indicative of the reception property of the reference signal and the identifier of the reference signal.

EXAMPLE 2. The method of operating the AN of EXAMPLE 1, wherein the reception property of the reference signal comprises an estimated angle of arrival of the reference signal.

EXAMPLE 3. The method of operating the AN of EXAMPLE 1 or 2, wherein the reception property of the reference signal comprises a coefficient measurement of a first path of the reference signal.

EXAMPLE 4. The method of operating the AN of any one of EXAMPLEs 1 to 3, wherein the reception property of the reference signal comprises a statistical property of an estimated angle of arrival of the reference signal.

EXAMPLE 5. A method of operating a wireless communication device, UE, wherein the method comprises transmitting, on a radio channel, a reference signal using a transmission property associated with an identifier of the reference signal, wherein the transmitted reference signal is indicative of the identifier of the reference signal.

EXAMPLE 6. The method of operating the UE of EXAMPLE 5, wherein the reference signal carries the identifier.

EXAMPLE 7. The method of operating the UE of EXAMPLE 5 or 6, wherein one or more resource elements used for transmitting the reference signal are indicative of the identifier of the reference signal.

EXAMPLE 8. The method of operating the UE of any one of EXAMPLEs 5 to 7, wherein the method comprises obtaining, from a location server node, LN, or from a serving AN, a message indicative of the transmission property associated with the identifier.

EXAMPLE 9. The method of operating the UE of any one of EXAMPLEs 5 to 8, wherein the method further comprises providing, to a location server node, LN, a message indicative of the transmission property associated with the identifier.

EXAMPLE 10. A method of operating a location server node, LN, the method comprising, obtaining, from one or more access nodes, ANs, a message indicative of a reception property of a reference signal and an identifier of the reference signal;

determining, from the identifier of the reference signal, a transmission property of the reference signal and a wireless communication device, UE, associated with the reference signal;

determining a position estimate of the UE based on the reception property and the transmission property of the reference signal.

EXAMPLE 11. The method of operating the LN of EXAMPLE 10, wherein the position estimate comprises an orientation of the UE.

EXAMPLE 12. The method of operating the LN of EXAMPLE 10 or 11, wherein the method further comprises:

determining a quality of the position estimate.

EXAMPLE 13. The method of operating the LN of any one of EXAMPLEs 10 to 12, wherein the transmission property of the reference signal comprises at least one of:

a spatial filter for transmitting the reference signal, a beam width information, in particular a half power beam width, HPBW, a beam pattern, a beam forming codebook.

EXAMPLE 14. An access node, AN, wherein the AN comprises control circuitry causing the AN to perform receiving, from a wireless communication device, UE, on a radio channel, a reference signal, determining a reception property of the reference signal, determining an identifier of the reference signal from the reference signal, wherein the identifier is associated with a transmission property of the reference signal, providing, to a location server node, LN, a message indicative of the reception property of the reference signal and the identifier of the reference signal.

EXAMPLE 15. An access node, AN, in particular the AN according to EXAMPLE 14, wherein a or the control circuitry causes the AN to perform the method of any one of EXAMPLEs 1 to 4.

EXAMPLE 16. A wireless communication device, UE, wherein the UE comprises control circuitry causing the UE to perform:

transmitting, on a radio channel, a reference signal using a transmission property associated with an identifier of the reference signal, wherein the transmitted reference signal is indicative of the identifier of the reference signal.

EXAMPLE 17. A wireless communication device, UE, in particular the UE of EXAMPLE 16, wherein a or the control circuitry causes the UE to perform the method of any one of EXAMPLEs 5 to 9.

EXAMPLE 18. A location server node, LN, wherein the LN comprises control circuitry causing the LN to perform obtaining, from one or more access nodes, ANs, a message indicative of a reception property of a reference signal and an identifier of the reference signal;

determining, from the identifier of the reference signal, a transmission property of the reference signal and a wireless communication device, UE, associated with the reference signal;

determining a position estimate of the UE based on the reception property and the transmission property of the reference signal.

EXAMPLE 19. A location server node, LN; in particular the LN of EXAMPLE 18, wherein a or the control circuitry causes the LN to perform the method of any one of EXAMPLEs 10 to 13.

The invention claimed is:

1. A method of operating an access node (AN) the method comprising:

receiving a reference signal transmitted from a wireless communication device (UE) on a radio channel using a transmission property associated with an identifier of the reference signal;

determining a reception property of the reference signal comprising an estimated angle of arrival (AoA) of the reference signal;

determining a further property of the reference signal indicative of multiple AoA values corresponding to the reference signal;

determining the identifier of the reference signal from the reference signal, wherein the identifier is associated with the transmission property of the reference signal, wherein one or more resource elements used by the UE for transmitting the reference signal are indicative of the identifier of the reference signal;

determining line of sight (LOS) information corresponding to a path component of the reference signal; and providing, to a location server node (LN) a message indicative of:

the reception property of the reference signal comprising the estimated AoA of the reference signal;

the further property of the reference signal indicative of the multiple AoA values;

the identifier of the reference signal; and the LOS information corresponding to the path component of the reference signal.

2. The method of operating the AN of claim 1, wherein the reception property of the reference signal comprises an estimated angle of arrival of the reference signal.

3. The method of operating the AN of claim 1, wherein the reception property of the reference signal comprises a coefficient measurement of a first path of the reference signal.

4. The method of operating the AN of claim 1, wherein the reception property of the reference signal comprises a statistical property of the estimated angle of arrival of the reference signal.

5. A method of operating a wireless communication device (UE) wherein the method comprises:

transmitting, on a radio channel, a reference signal using a transmission property associated with an identifier of the reference signal, wherein one or more resource elements used for transmitting the transmitted reference signal is indicative of the identifier of the reference signal, wherein the transmitted reference signal comprises information for use by an operatively associated access node (AN) in operative communication with the UE for the AN to determine:

line of sight (LOS) information corresponding to a path component of the reference signal; and a further property of the reference signal indicative of multiple uplink angle of arrival (UL-AoA) values corresponding to the reference signal.

6. The method of operating the UE of claim 5, wherein the reference signal carries the identifier.

7. The method of operating the UE of claim 5, wherein the method comprises:

obtaining, from a location server node (LN) or from a serving AN, a message indicative of the transmission property associated with the identifier.

8. The method of operating the UE of claim 5, wherein the method further comprises:

providing, to a location server node (LN) a message indicative of the transmission property associated with the identifier.

9. A method of operating a location server node (LN) the method comprising:

obtaining, from an access node (AN) a message indicative of a reception property of a reference signal received by the AN from a wireless communication device (UE) on a radio channel and indicative of an identifier of the reference signal, wherein the reception property of the reference signal received by the AN comprises an estimated angle of arrival (AoA) of the reference signal, wherein a further property of the reference signal is indicative of multiple AoA values corresponding to the reference signal received by the AN;

determining line of sight (LOS) information corresponding to a path component of the reference signal received by the AN from the UE;

determining, from the identifier of the reference signal, a transmission property of the reference signal and the US associated with the reference signal; and determining a position estimate of the UE based on the reception property and the transmission property of the reference signal.

10. The method of operating the LN of claim 9, wherein the position estimate comprises an orientation of the UE.

11. The method of operating the LN of claim 9, wherein the method further comprises:

determining a quality of the position estimate.

12. The method of operating the LN of claim 9, wherein the transmission property of the reference signal comprises at least one of:

a spatial filter for transmitting the reference signal;

a beam width information;

a beam pattern; and/or a beam forming codebook.

* * * * *